US012717313B2

(12) United States Patent
Shah et al.

(10) Patent No.: US 12,717,313 B2
(45) Date of Patent: Aug. 25, 2026

(54) EQUIPMENT EFFECTIVENESS IN MANUFACTURING ENVIRONMENT

(71) Applicant: Eaton Intelligent Power Limited, Dublin (IE)

(72) Inventors: Viral Shah, Gujarat (IN); Juhi Ajmera, Rajasthan (IN); Amit Joshi, Maharashtra (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 467 days.

(21) Appl. No.: 18/253,632

(22) PCT Filed: Jan. 20, 2021

(86) PCT No.: PCT/EP2021/051159
§ 371 (c)(1),
(2) Date: May 19, 2023

(87) PCT Pub. No.: WO2022/111857
PCT Pub. Date: Jun. 2, 2022

(65) Prior Publication Data
US 2023/0297085 A1 Sep. 21, 2023

(30) Foreign Application Priority Data
Nov. 26, 2020 (IN) ............................ 202011051550

(51) Int. Cl.
*G05B 19/418* (2006.01)

(52) U.S. Cl.
CPC ... *G05B 19/4185* (2013.01); *G05B 19/41885* (2013.01)

(58) Field of Classification Search
None
See application file for complete search history.

(56) References Cited

U.S. PATENT DOCUMENTS 10,768,076 B1 9/2020 Oostendorp
2004/0117050 A1* 6/2004 Oskin ................ G05B 23/0267 700/108
2007/0198724 A1* 8/2007 Hawkinson ........... H04L 67/563 709/226
2009/0094080 A1* 4/2009 Luotojarvi ......... G05B 19/4184 705/7.15
(Continued)

*Primary Examiner* — Kidest Worku
(74) *Attorney, Agent, or Firm* — LEYDIG, VOIT & MAYER, LTD.

(57) ABSTRACT

A method of measuring Operational Equipment Effectiveness for one or more machines is described. The method comprises the following steps. One or more machines and a server are connected to a data network. At the server, a stream of tags is received from the one or more machines. This stream of tags is provided over the data network. The tags are defined according to an open standard for providing machine data. At the server, Operational Equipment Effectiveness is determined for the one or more machines using a machine learning generated model. This machine learning generated model has been trained to determine Operational Equipment Effectiveness parameters for the one or more machines from the tags. A method of training a server to measure Operational Equipment Effectiveness for one or more machines is also described, together with a suitable server and a suitably enabled set of machines.

17 Claims, 7 Drawing Sheets

(56) References Cited

U.S. PATENT DOCUMENTS

| | | | | |
|---|---|---|---|---|
| 2009/0210814 | A1* | 8/2009 | Agrusa | G05B 23/0267 700/83 |
| 2010/0138712 | A1* | 6/2010 | Lee | G06F 11/0763 714/E11.023 |
| 2015/0106912 | A1* | 4/2015 | Brandon | H04Q 9/00 726/13 |
| 2018/0088548 | A1* | 3/2018 | Sangi | F01K 13/02 |
| 2018/0292812 | A1* | 10/2018 | Baseman | G05B 13/0265 |
| 2021/0190641 | A1* | 6/2021 | Oostendorp | G01M 99/005 |

* cited by examiner

Figure 7

EQUIPMENT EFFECTIVENESS IN MANUFACTURING ENVIRONMENT

TECHNICAL FIELD

The disclosure relates to methods and apparatus to determine equipment effectiveness in a manufacturing environment. In embodiments, these methods and apparatus relate to determination of Overall Equipment Effectiveness (OEE) and associated parameters.

BACKGROUND

In a manufacturing environment, it is relatively straightforward to determine what performance is expected from a manufacturing system as a whole when it is performing with 100% effectiveness, but it can be challenging to determine the reasons for failure to reach this level of performance, and particularly challenging to quantify them at anything below overall system level.

A widely accepted measure of manufacturing performance is Overall Equipment Effectiveness (OEE)—this measure was originally developed in the 1970s, and there is an extensive body of literature on the subject. The OEE of a manufacturing unit is calculated as the product of three separate elements: Availability (A), Performance (P) and Quality (Q). Availability (sometimes referred to as "uptime") is defined as the percentage of scheduled time that the relevant equipment is available to operate. Performance is defined as the speed at which the relevant equipment runs as a percentage of its designed speed. Quality is defined as the percentage of total units started that result in goods produced—it therefore measures the loss to failure during manufacturing. All three elements of OEE are susceptible to improvement, but different approaches may be needed to improve different elements.

OEE may in principle be measured at the level of individual machines, larger work units involving multiple machines, or whole plants. In practice, measurement of the elements can be challenging, and calculation of OEE can be unreliable. In most manufacturing environments, performance for each element is normally captured manually, and data relevant to OEE is often missed. For example, in a manufacturing plant it is common to ignore stoppages of less than 15 minutes—repeated short losses of this type can lead to a significant drop in Availability, which may not be captured at all. Manual data capture can lead to both over- and under-reporting, rendering the resulting data unreliable and use of the data ineffective. Other criteria relevant to OEE are very hard to capture manually—for example, change or variation in cycle time can lead to slower machine speed (a Performance loss), but such variation or idle time is very difficult for an operator to detect, particularly if that operator has multiple responsibilities. Scrap generation (a Quality loss) is similarly difficult and onerous to measure manually.

OEE is also typically reported at line level, rather than machine level. Line level OEE can be of limited value as a diagnostic tool if there are problems with one or a few machines, rather than all machines, in a production line.

It would be desirable to measure OEE more accurately in a manufacturing environment such that measured OEE and OEE elements could be used more effectively to diagnose and solve problems in manufacturing environments.

SUMMARY OF DISCLOSURE

In a first aspect, the disclosure provides a method of measuring Operational Equipment Effectiveness for one or more machines, comprising: connecting the one or more machines and a server to a data network; at the server, receiving a stream of tags from the one or more machines, wherein the stream of tags is provided over the data network, and wherein the tags are defined according to an open standard for providing machine data; and at the server, determining Operational Equipment Effectiveness for the one or more machines using a machine learning generated model, wherein the machine learning generated model has been trained to determine Operational Equipment Effectiveness parameters for the one or more machines from the tags.

Using this method, a reliable automated approach to determination of Operational Equipment Effectiveness can be established. Use of tags defined according to an open standard allows a consistent approach to be taken across all machine types without reliance on proprietary methods or data types, and use of a machine learning model allows an effective determination to be achieved empirically from the available data.

In some embodiments, at least one machine of the one or more machines is not adapted to provide tags according to the open standard. In such a case, the at least one machine is provided with a programmable logic controller adapted to receive state or performance data from the at least one machine and to output tags according to the open standard derived from the state or performance data received from the at least one machine.

In embodiments, the open standard for providing machine data is OPC-UA, and the server is an OPC server.

In embodiments, each of the tags provides information relating to the state or performance of one of the one or more machines together with a time of measurement. In such cases, each tag may be categorized as relevant to one or more of the Operational Equipment Effectiveness parameters.

In embodiments, the stream may be provided by the one or more machines providing tag output at defined intervals. In embodiments, the Operational Equipment Effectiveness data may be exported for display and/or analysis. In embodiments, the data network may be an Ethernet network.

In embodiments, the method may further comprise at the server, determining Operational Equipment Effectiveness for a line comprising a set of machines, wherein determining Operational Equipment Effectiveness for the line comprises aggregating Operational Equipment Effectiveness for the machines in the set of machines.

In a second aspect, the disclosure provides a method of training a server to measure Operational Equipment Effectiveness for one or more machines, the method comprising: providing a machine learning model to the server; establishing training data for the machine learning model, wherein the training data comprises output from the one or more machines comprising a plurality of tags, wherein the tags are defined according to an open standard for providing machine data, wherein the tags are provided together with Operational Equipment Effectiveness parameter values applying at the time of creation of the respective tag; and training the machine learning model with the training data to provide a trained analysis model adapted to identify Operational Equipment Effectiveness parameter values from a stream of tags from the one or more machines and to determine Operational Equipment Effectiveness thereby.

The open standard for providing machine data may then be OPC-UA, and the server may be an OPC server. The tags may each provide information relating to the state or performance of one of the one or more machines together with a time of measurement. In such a case, before training each tag may be categorized as relevant to one or more of the Operational Equipment Effectiveness parameters.

In a third aspect, the disclosure provides server adapted to measure Operational Equipment Effectiveness for one or more machines, the server comprising: a data input, wherein the server is adapted to receive a stream of tags from the one or more machines over a data network, wherein the tags are defined according to an open standard for providing machine data; and a trained analysis model, wherein the trained analysis model is adapted to identify Operational Equipment Effectiveness parameter values from the stream of tags and determine Operational Equipment Effectiveness for the one or machines thereby.

In a fourth aspect, the disclosure provides a system of machines with determined Operational Equipment Effectiveness, the system comprising: a server as set out in the third aspect; one or more machines adapted to provide a stream of tags, wherein the tags are defined according to an open standard for providing machine data; and a data network connecting the server and the one or more machines.

In embodiments, at least one machine of the one or more machines is not adapted to provide tags according to the open standard, and the at least one machine is provided with a programmable logic controller adapted to receive state or performance data from the at least one machine and to output tags according to the open standard derived from the state or performance data received from the at least one machine. The open standard for providing machine data may be OPC-UA, and the server may be an OPC server. The data network may be an Ethernet network.

BRIEF DESCRIPTION OF FIGURES

Embodiments of the disclosure will now be described, by way of example, with reference to the following figures, in which:

FIG. 7 is an exemplary illustration of Idle Time Analysis using OEE element data obtained using an embodiment of the disclosure.

DETAILED DESCRIPTION

Figure 1:
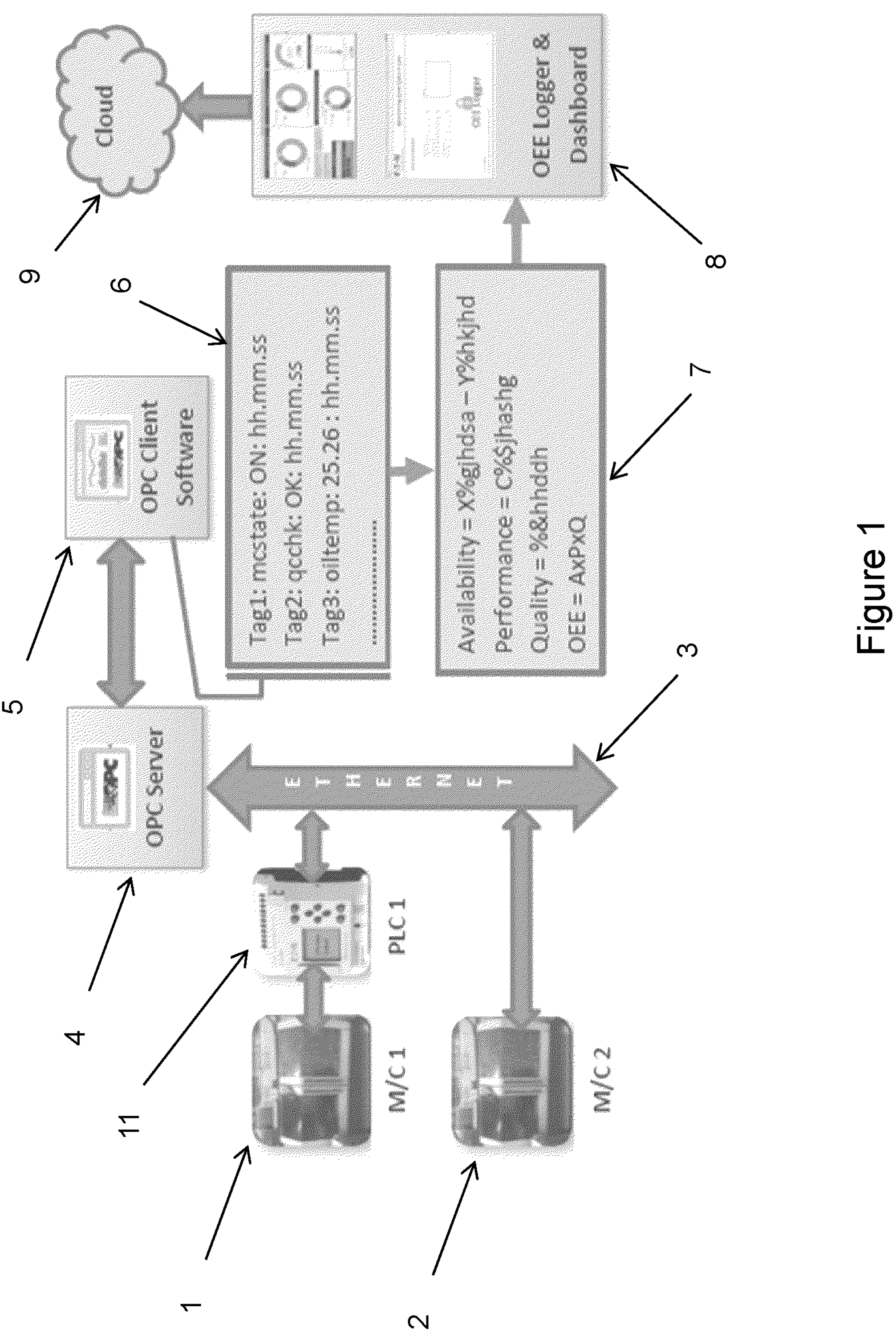
FIG. 1 is an embodiment of manufacturing system employing an embodiment of the disclosure.

As indicated above, Overall Equipment Effectiveness is a widely accepted measure of manufacturing performance. The OEE of a manufacturing unit is calculated as the product of three separate elements (or parameters): Availability (A), Performance (P) and Quality (Q). Availability (sometimes referred to as "uptime") is defined as the percentage of scheduled time that the relevant operation is available to operate—an Availability score of 100% means an operation is always running during Planned Production Time. Performance is defined as the speed at which the relevant operation runs as a percentage of its designed speed—a Performance score of 100% means that when an operation is running, it is running as fast as possible. Quality is defined as the percentage of total units started that result in goods produced—it therefore measures the loss to failure during manufacturing—a Quality score of 100% means there are no defects, and only good parts are being produced. OEE can be considered a measurement of success in making the right thing (Quality) in the right way (Performance) at the right time (Availability)—it takes into account all losses, and an OEE score of 100% means that you are manufacturing only good parts, as fast as possible, with no stop time. Further discussion and practical definitions for operational use can be found at OEE.com.

TABLE 1

OEE Parameters and Losses Affecting OEE

| Parameter | Definition | Category of Loss | Instances Contributing to Loss |
|---|---|---|---|
| Availability (A) | Run Time/Planned Production Time | Unplanned stops<br>Planned stops | Equipment breakdown<br>Setup and changeover |
| Performance (P) | Net Run Time/ Run Time | Minor stops<br>Variation in cycle time | Idling and wait<br>Reduced speed |
| Quality (Q) | Fully Productive Time/Net Run Time | Rejections<br>Startup trials | Defects<br>Setup scrap |

Table 1 indicates how these parameters are affected by different types of loss. Here "run time" is calculated by subtracting down time from planned production time, and "planned production time" is determined by subtracting scheduled loss time (such as changeover) from total time. "Net run time" is then the time remaining once schedule loss, availability loss and performance loss (the effective lost time due to reduced speed) are subtracted from all time, and "fully productive time" is the time remaining after all losses are subtracted.

To measure OEE accurately, the losses in each category need to be measured accurately. In conventional arrangements, some or all of these are generally logged manually. As has been discussed, work practices (such as not logging short periods of down time or idle time) can lead to considerable inaccuracy in reporting, and some elements (such as losses due to reduced speed of working) may be very difficult to assess manually. OEE recording will also typically be done at the line level rather than the individual machine level, which limits the value of the data if machines perform heterogeneously.

The present inventors identified that a number of these problems may be addressed if recording of losses, and hence determination of OEE parameter values, were to be done automatically at the machine level, rather than manually at the machine or line level. It is however challenging to record losses automatically in this way. A manufacturing environment typically involves a number of different machine types, and existing architectures for machine control have not been developed in such a way as to capture or process the information needed for OEE.

The present inventors have however further appreciated that information recorded and communicated using an open standard for providing and communicating machine data is particularly effective for this purpose, as this allows information to be obtained from any machine without any limitations arising from proprietary considerations. The Open Platform Communication (OPC) standards are particularly suitable here, particularly when OPC UA (Open Platform Communication-Unified Architecture) tags are used. OPC (https://en.wikipedia.org/wiki/Open_Platform-_Communications) is a suite of standards now primarily associated with telecommunications, but originally developed for process control in industrial environments. OPC UA is a cross platform open protocol for machine to machine communication for industrial automation—it is particularly designed to allow interoperability between equipment of different types, as it provides semantic interoperability throughout an otherwise heterogeneous connected system. OPC UA allows definition of tags to represent data points in a system. With appropriate tag definition, the losses affecting the OEE parameters can be captured on a machine by machine basis, and OEE determined at any relevant scale (machine, line or plant) from machine upwards. OPC UA specifications can be found at https://opcfoundation.org/developer-tools/specifications-unified-architecture. OPC UA version 1.0+ may be used for embodiments described here.

FIG. 1 shows an architecture that can be used to implement this approach. A first machine 1 is not itself OPC UA compliant, but it can be controlled through a programmable logic controller (PLC) 11 which is OPC UA compliant and can act as an OPC UA converter to provide OPC UA tag data. Other machines such as a second machine 2 are OPC UA compliant and can provide OPC UA tag data directly. Tag data can therefore be recorded for both the first machine 1 and the second machine, and subsequently communicated over an appropriate network 3 to an OPC server 4. This OPC server 4 runs OPC client software 5, and the OPC client software 5 uses a stream of tag data 6 to determine an OEE output 7 comprising OEE parameters and OEE itself as determined from the tag data. This OEE output may be logged and displayed on an OEE dashboard 8, which may be viewed remotely from the manufacturing site (as shown by connection to the cloud 9).

As noted above, some machines such as the first machine 1 may not be OPC UA compliant, whereas others such as the second machine 2 will be. In practice, any machine will have a control interface of some sort, and this control interface will use a known communications protocol—for example, a serial communications standard such as RS232 or RS485. A PLC 11 can then easily be programmed to receive outputs from the first machine 1 and provide OPC UA tags. In this case, OPC UA tags may be defined in connection with the OPC client software 5. Where a machine is OPC UA compliant such as the second machine 2, it will typically provide OPC UA tags as defined by the OEM for the machine.

The OPC server 4 will then receive a stream of OPC UA tags over the network 3 that connects it to all the machines—in this case, the network used is Ethernet. Ethernet connectivity may be achieved through an appropriate gateway. This stream of tag data here comprises a number of tags, each here showing a value for a parameter (a state for some variables—here "ON" for a variable indicating machine state, and "OK" for a variable indicating manufactured part quality—and a numerical value for other variables, (such as oil temperature as in the example shown) and a timestamp. If every machine in the system had been originally designed to provide OPC UA tag data for determining OEE for consistency with specific client software, the data from the OPC UA tag stream could simply be used to calculate values for Availability, Performance and Quality, and hence OEE, at this point. Where these conditions do not apply, a different strategy needs to be used to determine the elements of OEE, and hence to determine OEE itself.

An effective strategy is to use machine learning to determine individual elements. A suitable machine learning algorithm—in this case, the algorithm will generally be a classifier of some type—can be trained on an existing stream of tag data with associated measured states. Once trained—for example, with a month of measured data and associated OEE element values—the OPC client software can then work from received OPC UA tags to determine associated OEE element values. This may be done on whatever scale is appropriate, but using tag data from individual machines, it is particularly effective to determine OEE element values at the machine level. Aggregation of OEE data from machine level to line level will also be straightforward to achieve.

Figure 2:
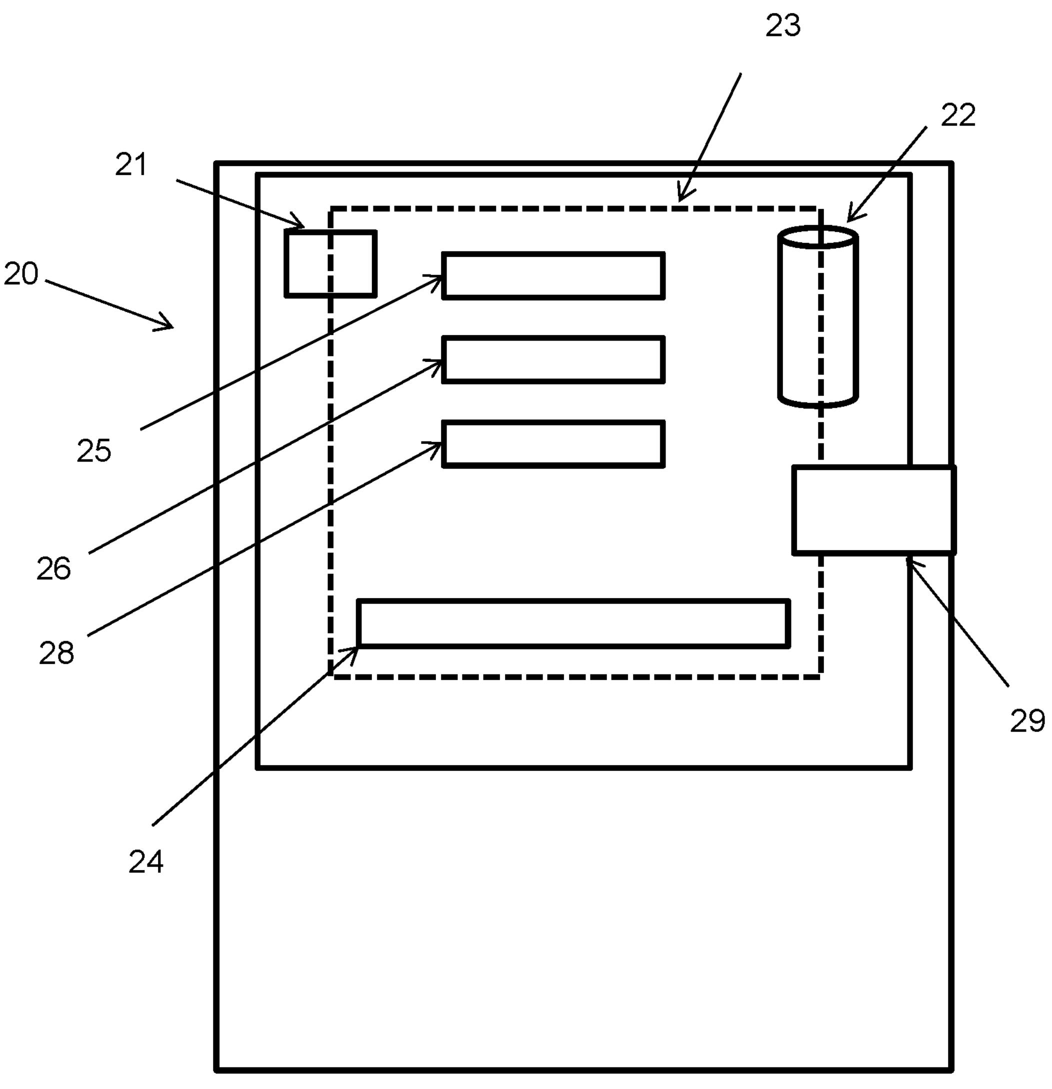
FIG. 2 is an embodiment of a server adapted to perform a method according to an embodiment of the disclosure.

FIG. 2 illustrates functionally an OPC server with appropriate functionality. The OPC server has one or more processors 21 and one or more memories 22 together defining an operating environment 23 under the control of an operating system 24. OPC client software 25 runs in this operating environment 26, along with machine learning software 27 as will be discussed further below. An OPC client data output program 28 is also shown as running here—alternatively, data can simply be output to a remote source and output provided remotely, possibly from a central server integrating OEE information from several sites and presenting assembled data over the cloud. A communications interface 29 is provided to enable network communication. In this embodiment, network communication comprises interaction over Ethernet with the machines being measured, and interaction over the public Internet or otherwise with services operating in the cloud for display or analysis of OEE information.

Figure 3:
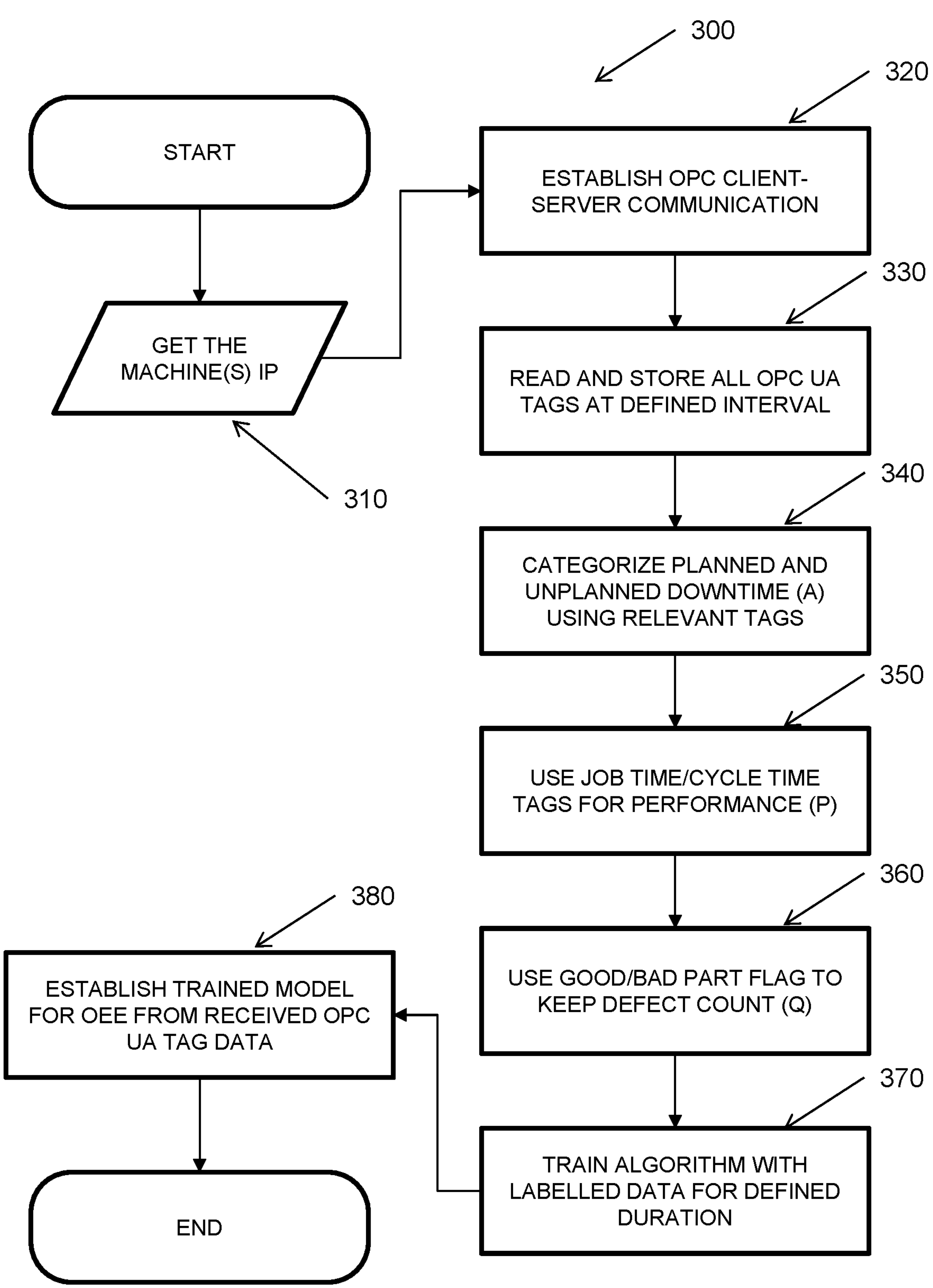
FIG. 3 shows a method of training the system of FIG. 1 to determine OEE according to an embodiment of the disclosure.
Figure 4:
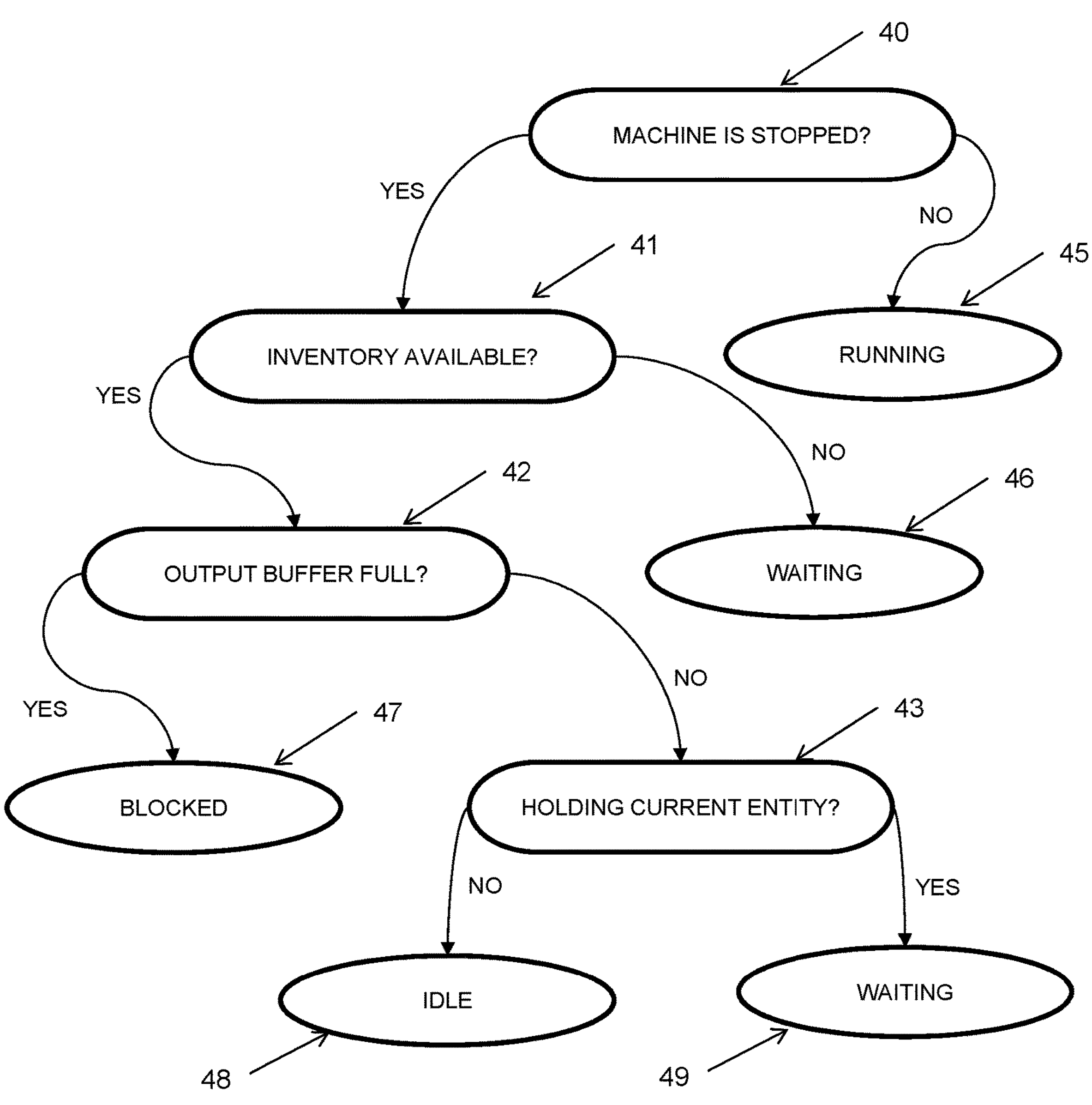
FIG. 4 shows a decision tree to determine machine state which may be used in embodiments of the disclosure.
Figure 5:
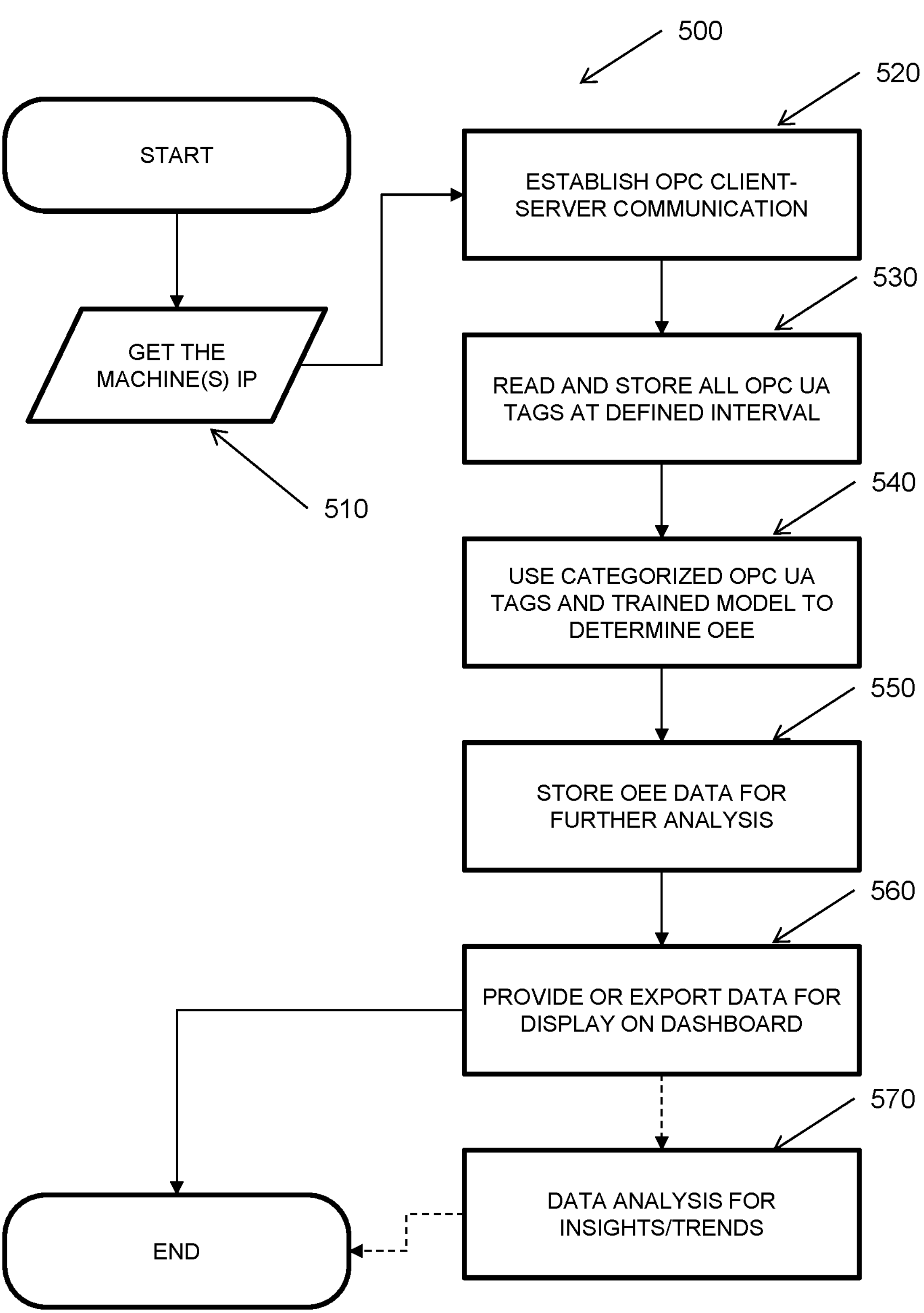
FIG. 5 shows a method of measuring OEE using the system of FIG. 1 trained by the method of FIG. 3.

Process steps involved in the establishment and use of the OPC UA based system shown in FIG. 1 are shown in FIGS. 3 to 5 and described further below.

A process 300 is shown covering initial training of the system to determine OEE from OPC UA tag data. The process starts with establishing connection between the individual machines and the OPC server—for each machine the IP address is determined 310, and communication is established between machines and the OPC UA server 320. This establishes a set of machines for which OEE is to be determined. The data that will be used to establish OEE is an assemblage of OPC UA tags provided at defined intervals 330. Different OPC UA tags are relevant to different OEE elements, and an initial step in training is determining which tags are relevant to particular elements. Planned and unplanned downtime is categorised using relevant tags to assess which data is relevant to availability 340. Similarly, tags relevant to job time and cycle time are identified for determining which data is relevant to performance 350. Defect related information—such as good part and bad part flags—are used to identify defect counts, and similar information related to quality 360. As noted above, in the simplest cases (for a single machine with a set of flags that map perfectly on to OEE parameters), it may be possible simply to calculate OEE at this point. In practice, however, there will be an assemblage of machines and OPC UA data may not have a simple relationship to OEE parameters—if this is the case, machine learning is used 370 to develop and train an algorithm, using labelled data. Using this approach, for example, a month of labelled data for a machine may be provided, so the OPC UA tags can be matched against conventionally (but accurately) measured OEE parameter values. The algorithm can be trained using this labelled data to provide a trained model 380 to establish OEE parameter values from a stream of incoming OPC UA tags from the assemblage of machines.

This process may be simplified if trained models already exist for similar machines. As the context of each machine differs, it will typically not be appropriate to port a trained model directly across to another machine of the same type. However, re-training an existing pre-trained model may be easier, and may require less labelled data, than to train a completely new model.

There is no specific limitation to the type of machine learning used for this purpose—a single machine learning mechanism (such as a classifier, which may be particularly appropriate for data of this type) may be used, or several may be used in combination. A classifier here may be particularly appropriate, as determination of A and P values in particular relate to a determination of machine state, or the effective state of a group of machines—a classifier is particularly well suited to making a state determination on the basis of an assemblage of tags. Standard machine learning methods may be used for training—for example, the training data may be divided into a training set to train the model and an evaluation set to identify whether the model is effectively trained.

Machine learning may be assisted, as shown in FIG. 3, by some initial categorisation of tags as relevant to particular machine states and hence to particular OEE parameters. A process of identifying machine states, and hence tag relevance to particular loss types, is set out in FIG. 4 in the form of a hierarchical tree. First of all, it is determined whether the machine is stopped 40—if not, it is running 45. If it is stopped, it is first determined whether inventory is available 41—if not, then the machine is waiting 46. If there is inventory available, the next check is whether the output buffer is full 42—if so, the machine state is blocked 47. If not, the final check is whether the machine is holding 43 a current entity (for example a piece of work to be worked on by the machine). If not, the machine is idle 48, but if yes, then it is waiting 49. These different machine states can then be associated with different loss states, where appropriate—for example, waiting states will typically map to a performance loss.

FIG. 5 shows the use of the machine learning model developed by the process set out in FIG. 3. As before, on start machine IP addresses are obtained 510 and communication with the OPC server established 520. A stream of OPC UA tags is then provided for each machine at a defined interval 530. The OPC UA tags are used in the trained model to provide OEE parameter values 540—in embodiments provided here, this is by machine, with OEE calculated at machine level. OEE values can then be aggregated for the assemblage of machines in a production line. Further aggregation can provide plant level results. This process of OEE determination will typically involve obtaining OEE parameter data as well as OEE values themselves. This OEE data is stored 550 for further analysis. It may also be provided to a local dashboard, or exported to a remote dashboard, so that the OEE data can be considered by users 560. There may also be analysis of the OEE data—either locally at the OPC UA server, or remotely—to determine trends and other insights.

There are many benefits to this approach. The OPC UA protocol combines effectively with Ethernet protocols, so using these two approaches together can allow a large number of machines (hundreds) to be associated with one OPC server. Implementation is non-invasive, requiring no changes to existing machines and no added sensors—all that is required is an OPC server, an Ethernet network and PLCs at machines that do not themselves provide an OPC UA output—after some initial set-up, there is little maintenance required and the system itself will be highly reliable as it essentially only comprises a straightforward server implementation and an Ethernet network, both of which would normally have a very high uptime. Manual intervention is not required as the whole process is automated, even minor losses are captured effectively, and the risk of data loss is minimal. Data generated at the machines themselves is processed effectively into digital data is collected in a form suitable for analysis, and this may be used for more complex analysis, such as detection of anomalies or potential breakdowns (such analysis is however itself out of the scope of the present specification).

This contrasts with recent approaches to use industrial Internet of Things platforms (IIoT) to perform a large number of measurement and workflow tasks in manufacturing environments, where these tasks may include OEE determination. Exemplary offerings are provided by PTC ThingWorx and FORCAM. These solutions are invasive in that they require deployment of a large number of IoT-enabled sensors, expensive to license, and can require significant computing resource to process effectively because of the large amount of additional data generated. While these platforms are powerful, the implementation of the present disclosure described here provides equivalent output at lower complexity and cost with high reliability.

Figure 6:
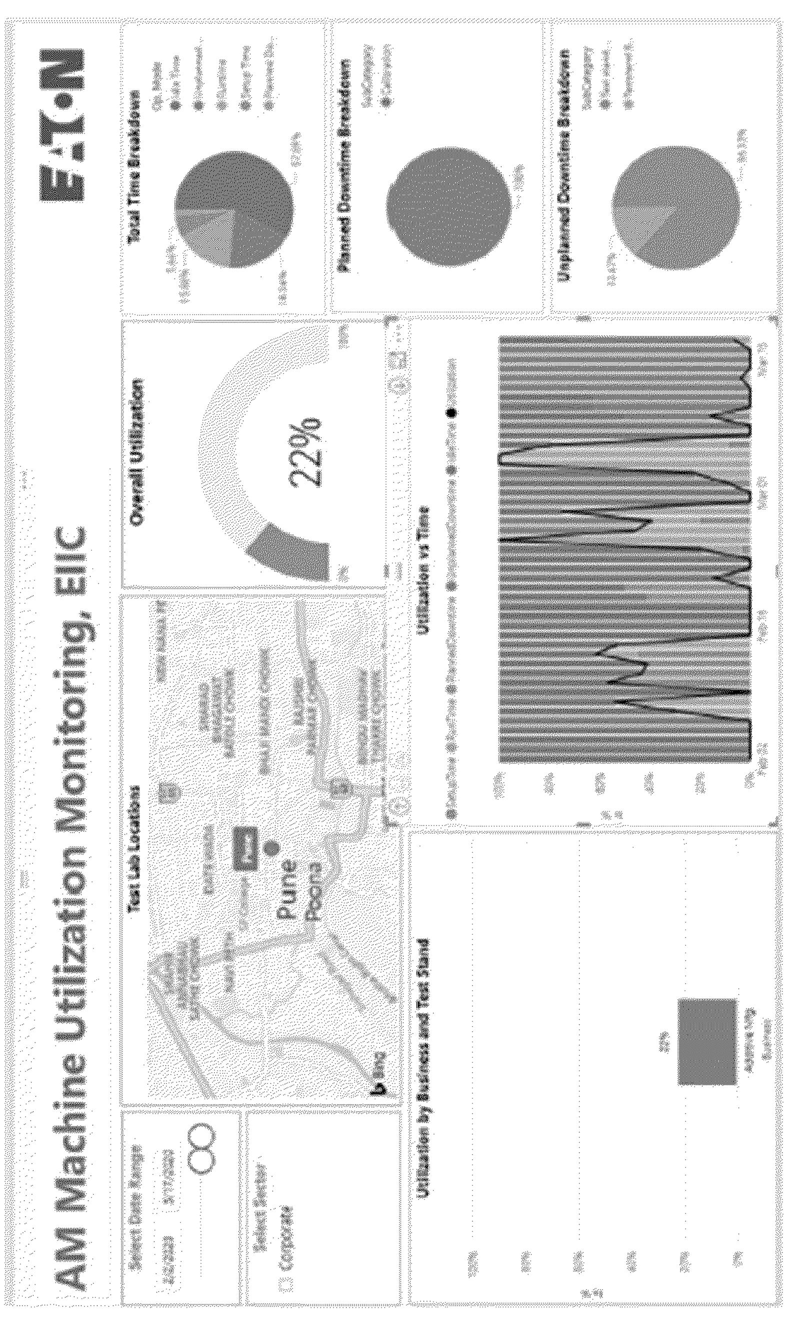
FIG. 6 is an exemplary illustration of OEE reporting using an embodiment of the disclosure.
Figure 7:
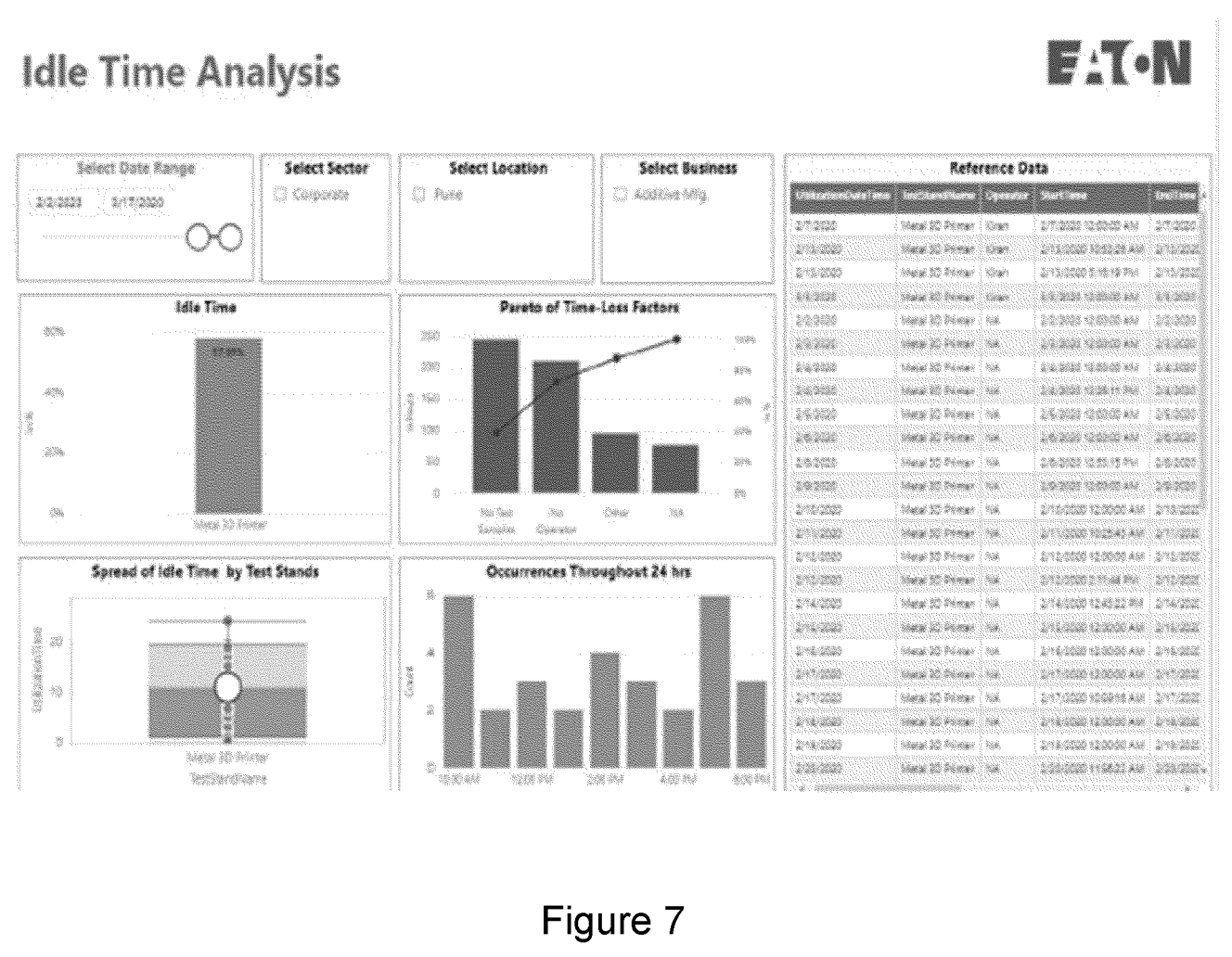

FIGS. 6 and 7 show results of an exemplary implementation of this approach. The machine output measured here is a GE Concept laser AM printer at an applicant site—this machine itself supports OPC UA communication. FIG. 6 shows availability and utilization—modelling suggests that for any machine producing a standard output rather than multiple outputs, availability and utilization will typically be more complex to establish than performance and quality. FIG. 6 shows utilization, but further breaks down time utilization into specific states (such as run time, idle time, set-up time, and planned and unplanned downtime), with a further breakdown of planned and unplanned downtime. FIG. 7 shows a more detailed idle time analysis. Collection of such data over an extended time period can be used for longer term analysis (outside the scope of this specification).

Using the OPC UA framework-based approach described here enables the development of an effective OEE determination solution which uses openly available data and is not reliant on specific machine manufacturers—it is particularly effective for use with assemblages of machines from different manufacturers as a result. It is also particularly suitable for remote tracking of OEE, and for further analysis on the data set provided for OEE determination. The skilled person will appreciate that many further embodiments are possible within the spirit and scope of the disclosure set out here.

The invention claimed is:

1. A method of measuring Operational Equipment Effectiveness for one or more machines, comprising:

connecting the one or more machines and a server to a data network;

at the server, receiving a stream of tags for the one or more machines, wherein the stream of tags is provided over the data network, and wherein the tags are defined according to an open standard for providing machine data;

at the server, determining Operational Equipment Effectiveness for the one or more machines using a machine learning generated model, wherein the machine learning generated model has been trained to determine Operational Equipment Effectiveness parameters for the one or more machines from the tags; and utilizing the determined Operational Equipment Effectiveness for the one or more machines to diagnose and solve a problem in a manufacturing environment that comprises the one or more machines, wherein the open standard for providing machine data is OPC-UA, and wherein the server is an OPC server.

2. The method of claim 1, wherein at least one machine of the one or more machines is not adapted to provide tags according to the open standard, and wherein the at least one machine is provided with a programmable logic controller adapted to receive state or performance data from the at least one machine and to output tags according to the open standard derived from the state or performance data received from the at least one machine.

3. The method of claim 1, wherein each of the tags provides information relating to the state or performance of one of the one or more machines together with a time of measurement.

4. The method of claim 3, wherein each tag is categorized as relevant to one or more of the Operational Equipment Effectiveness parameters.

5. The method of claim 1, wherein the stream is provided by the one or more machines providing tag output at defined intervals.

6. The method of claim 1, wherein the Operational Equipment Effectiveness data is exported for display and/or analysis.

7. The method of claim 1, wherein the data network is an Ethernet network.

8. The method of claim 1, further comprising at the server, determining Operational Equipment Effectiveness for a line comprising a set of machines, wherein determining Operational Equipment Effectiveness for the line comprises aggregating Operational Equipment Effectiveness for the machines in the set of machines.

9. The method of claim 1, wherein determining the Operational Equipment Effectiveness parameters comprises determining loss associated with each of the Operational Equipment Effective parameters.

10. The method of claim 1, wherein the tags comprise a first set of tags provided over the data network respectively by at least one first machine, of the one or more machines, adapted to provide tags according to the open standard.

11. A method of training a server to measure Operational Equipment Effectiveness for one or more machines, the method comprising:

providing a machine learning model to the server;

establishing training data for the machine learning model, wherein the training data comprises output from the one or more machines comprising a plurality of tags, wherein the tags are defined according to an open standard for providing machine data, wherein the tags are provided together with Operational Equipment Effectiveness parameter values applying at the time of creation of the respective tag;

training the machine learning model with the training data to provide a trained analysis model adapted to identify Operational Equipment Effectiveness parameter values from a stream of tags from the one or more machines and to determine Operational Equipment Effectiveness thereby, wherein the determined Operational Equipment Effectiveness for the one or more machines is configured for diagnosing and solving problems in a manufacturing environment that comprises the one or more machines, wherein the open standard for providing machine data is OPC-UA, and wherein the server is an OPC server.

12. The method of claim 11, wherein the tags each provide information relating to the state or performance of one of the one or more machines together with a time of measurement.

13. The method of claim 12, wherein before training each tag is categorized as relevant to one or more of the Operational Equipment Effectiveness parameters.

14. A server adapted to measure Operational Equipment Effectiveness for one or more machines, the server comprising:

a data input, wherein the server is adapted to receive a stream of tags from the one or more machines over a data network, wherein the tags are defined according to an open standard for providing machine data;

a trained analysis model, wherein the trained analysis model is adapted to identify Operational Equipment Effectiveness parameter values from the stream of tags and determine Operational Equipment Effectiveness for the one or machines thereby; and a processor configured to utilize the determined Operational Equipment Effectiveness for the one or more machines to diagnose and solve a problem in a manufacturing environment that comprises the one or more machines, wherein the open standard for providing machine data is OPC-UA, and wherein the server is an OPC server.

15. A system of machines with determined Operational Equipment Effectiveness, the system comprising:

a server as claimed in claim 14;

one or more machines adapted to provide a stream of tags, wherein the tags are defined according to an open standard for providing machine data; and, a data network connecting the server and the one or more machines.

16. The system of claim 15, wherein at least one machine of the one or more machines is not adapted to provide tags according to the open standard, and wherein the at least one machine is provided with a programmable logic controller adapted to receive state or performance data from the at least one machine and to output tags according to the open standard derived from the state or performance data received from the at least one machine.

17. The system of claim 15, wherein the data network is an Ethernet network.

* * * * *